United States Patent
Marupaduga et al.

(10) Patent No.: US 10,135,509 B1
(45) Date of Patent: Nov. 20, 2018

(54) OPTIMIZATION OF FULL-POWER BROADCAST BEAMFORMING

(71) Applicant: Sprint Communications Company L.P., Overland Park, KS (US)

(72) Inventors: Sreekar Marupaduga, Overland Park, KS (US); Andrew Mark Wurtenberger, Olathe, KS (US); Rajveen Narendran, Olathe, KS (US); Ryan Patrick Dreiling, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 151 days.

(21) Appl. No.: 15/244,842

(22) Filed: Aug. 23, 2016

(51) Int. Cl.
*H04W 24/02* (2009.01)
*H04B 7/06* (2006.01)
*H04W 4/02* (2018.01)
*H04L 12/801* (2013.01)
*H04H 20/38* (2008.01)

(52) U.S. Cl.
CPC .......... *H04B 7/0617* (2013.01); *H04H 20/38* (2013.01); *H04L 47/29* (2013.01); *H04W 4/025* (2013.01); *H04W 24/02* (2013.01)

(58) Field of Classification Search
CPC ...... H04W 4/025; H04W 24/02; H04L 47/29; H04B 7/0617
See application file for complete search history.

(56) References Cited

U.S. PATENT DOCUMENTS

| 8,280,426 | B2 | 10/2012 | Guo et al. | |
|---|---|---|---|---|
| 2013/0148754 | A1 | 6/2013 | Tee et al. | |
| 2014/0334318 | A1* | 11/2014 | Pica | H04W 36/14 370/252 |
| 2017/0034799 | A1* | 2/2017 | Kim | H04W 56/00 |
| 2017/0257780 | A1* | 9/2017 | Ryoo | H04W 16/28 |

FOREIGN PATENT DOCUMENTS

WO    2013014566 A1    1/2013

* cited by examiner

*Primary Examiner* — Wei Zhao

(57) ABSTRACT

Systems, methods, and computer-readable media for dynamically optimizing the use of full-power broadcast beamforming within a wireless communication network are provided herein. Though full-power broadcast beamforming may result in increased interference and decrease throughput, the increased coverage area provided by full-power broadcast beamforming is favored under certain conditions, including the locations of user devices within a network cell. Accordingly, location data may be received from user devices within a network cell utilizing a plurality of beams, and the locations of each of the user devices may be used to determine whether to enable full-power broadcast beamforming where each beam within plurality of beams is at a maximum signal strength. Upon determining to enable full-power broadcast beamforming, a signal weight for one or more of the beams may be adjusted to full power.

20 Claims, 5 Drawing Sheets

OPTIMIZATION OF FULL-POWER BROADCAST BEAMFORMING

BRIEF SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, dynamically optimizing the use of full-power broadcast beamforming within a wireless communication network. Full-power broadcast beamforming provides a stronger signal through beamforming technology to provide a greater coverage area and service to more user devices. At the same time, full-power broadcast beamforming may create interference with neighboring network cells and result in decreased throughput. As such, networks have traditionally opted for tapered beamforming, instead of full-power broadcast beamforming. While tapered beamforming has a decreased risk of interference and may allow for greater throughput, systems utilizing only tapered beamforming fail to take advantage of increased coverage provided by full-power broadcast beamforming, which, in some instances, outweighs the possibility of interference and decreased throughput.

The present disclosure seeks to optimize full-power broadcast beamforming by using both full-power broadcast beamforming and tapered beamforming within a network cell based on whether conditions favor full-power broadcast or tapered beamforming. Specifically, the present disclosure provides methods and systems for receiving location data from user devices within a network cell utilizing a plurality of beams and, based on the locations of the user devices within the cell, determining whether to enable full-power broadcast beamforming where each beam within plurality of beams is at a maximum signal strength. Upon determining to enable full-power broadcast beamforming, a signal weight for one or more of the beams is adjusted to full power. In some aspects, when full-power broadcast beamforming is enabled, additional location data is received from user devices within the network cell and, based on the location of each device from the additional location data, it is determined to disable full-power broadcast beamforming. Upon determining to disable full-power broadcast beamforming, a signal weight for one or more of the beams is adjusted to less than maximum signal strength.

BRIEF DESCRIPTION OF THE DRAWINGS

Illustrative embodiments of the present invention are described in detail below with reference to the attached drawing figures, and wherein.

DETAILED DESCRIPTION

Figure 1:
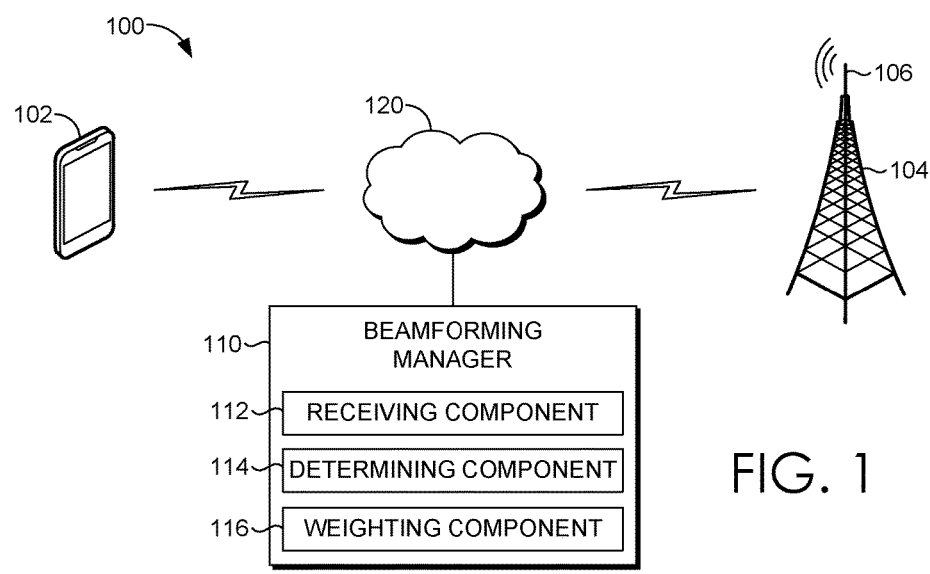
FIG. 1 depicts a wireless communication network, according to an embodiment of the present disclosure.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Aspects of the present invention may be embodied as, among other things, a method, a system, or a set of instructions embodied on one or more computer-readable media. As mentioned, embodiments are directed towards dynamically optimizing the use of full-power broadcast beamforming within a wireless communication network. The wireless communication network may have a base station forming a plurality of beams to provide service. A signal within a wireless communication network may be associated with a particular beamforming weight. A beamforming weight, as used herein, refers generally to a phase angle and/or amplitude value to be applied to a signal. Different weighting patterns may be used to create different signal patterns. Full-power broadcast beamforming occurs when each beam is weighted to have a maximum signal strength. Full-power broadcast beamforming provides a stronger signal through beamforming technology to provide a greater coverage area and service to more user devices. At the same time, full-power broadcast beamforming produces an irregular signal pattern compared to traditional technologies and may result in overlap with adjacent network cells, thereby causing interference. Additionally, because full-power broadcast beamforming may result in more user devices connected to the network, there may be a decrease in throughput within the cell. For these reasons, weights within a beamforming network have been tapered such that not all beams are at a maximum signal strength. Traditional networks that utilize only tapered beamforming forgo the advantage of increased coverage provided by full-power broadcast beamforming.

The technology disclosure herein, however, recognizes that there may be periods when the benefits of full-power broadcast beamforming outweigh the disadvantages and seeks to optimize implementation of full-power broadcast beamforming based on these periods. Specifically, when there is a greater number or a greater percentage of user devices located within the cell edge, or the area of the network cell farthest from the base station, compared to other regions of the network cell, the benefits of increased coverage from full-power broadcast beamforming may balance or outweigh the increased interference and decrease throughput. As such, based on location date of the user devices, it may be determined to adjust beamforming weights to achieve full-power broadcasting. At other times, when there is not a larger number or percentage of user devices located within the cell edge compared to other areas of the network, the benefits of full-power broadcast beamforming may be outweighed by the disadvantages, triggering a determination to disable full-power broadcast beamforming and adjust the beamforming weights so that not every beam is operating at a maximum signal strength.

Accordingly, in one aspect, the present disclosure includes one or more non-transitory computer-readable storage media having computer-executable instructions embodied thereon that, when executed, perform a method for optimizing full-power broadcast beamforming within a network cell. The method comprises, at a base station having a plurality of beams, receiving location data from a first set of user devices comprising one or more user devices within the network cell. The location data indicates a location of each user device within the first set of user devices. The method further includes determining, based on the location data, whether to enable full-power broadcast beamforming where a signal for each beam within the plurality of beams is at maximum signal strength. Upon determining to enable full-power broadcast beamforming, a signal weight for one or more beams within the plurality of beams is adjusted to full power.

In another aspect, the present disclosure includes method for optimizing full-power broadcast beamforming at a base station within a network cell. The method comprises receiving, at a base station having a plurality of beams, location data from a first set of user devices. The first set of user devices comprises one or more user devices within the network cell, and the location data indicates a location of each user device within the first set of user devices. The location of each user device is one of cell center, cell middle, and cell edge. Cell center comprises a region within the network cell adjacent to the base station; cell middle comprises a region within the network cell between cell center and cell edge, and cell edge comprises a region forming a periphery of the network cell. Based on the location of each user device within the first set of user devices, it is determined whether to enable full-power broadcast beamforming where a signal for each beam within the plurality of beams is at maximum signal strength. Upon determining to enable full-power broadcast beamforming, a signal weight for one or more beams within the plurality of beams is adjusted to full power.

In yet a further aspect, a system for optimizing full-power broadcast beamforming at a base station within a network cell is provided. The system includes one or more processors associated with a base station having a plurality of beams and one or more computer storage media storing computer-executable instructions that, when executed by the one or more processors, implement a method. The method includes receiving location data from a first set of user devices comprising one or more user devices within the network cell, wherein the location data indicates a location of each user device within the first set of user devices. Based on the location of each user device, it is determined whether to enable full-power broadcast beamforming in which a signal for each beam within the plurality of beams is at maximum signal strength. The method further includes, upon determining to enable full-power broadcast beamforming, adjusting a signal weight for one or more beams within the plurality of beams to full power.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed and are in no way meant to limit the scope of the present invention. The following is a list of these acronyms:

3G Third Generation Mobile Telecommunications
4G Fourth Generation Mobile Telecommunications
BF Beam Forming
CD-ROM Compact Disk Read Only Memory
CDMA Code Division Multiple Access
GPRS General Packet Radio Service
GSM Global System for Mobile communications: originally from Groupe Special Mobile
DVD Digital Versatile Discs
EEPROM Electrically Erasable Programmable Read Only Memory
eNodeB Evolved Node B
LTE Long Term Evolution
MIC Microphone
PA Power Amplifier
PC Personal Computer
PDA Personal Digital Assistant
RAM Random Access Memory
ROM Read Only Memory
TDMA Time Division Multiple Access
UE User Equipment
UMTS Universal Mobile Telecommunications System
VOIP Voice Over Internet Protocol
VoLTE Voice Over LTE
WiMAX Worldwide Interoperability for Microwave Access Further, various technical terms are used throughout this description. An illustrative resource that fleshes out various aspects of these terms can be found in Newton's Telecom Dictionary, 25th Edition (1009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

As previously mentioned, embodiments of the present invention are directed to optimizing full-power broadcast beamforming within a network cell. A network cell may comprise a base stations to facilitate wireless communication between a communications device within the network cell, such as communications device 500 described with respect to FIG. 5, and a network. As shown in FIG. 1, a communications device may be a user device 102. In the network environment 100, user device 102 may communicate with other devices, such as mobile devices, servers, etc. The user device 102 may take on a variety of forms, such as a personal computer, a laptop computer, a tablet, a netbook, a mobile phone, a Smart phone, a personal digital assistant, or any other device capable of communicating with outer devices. For example, the user device 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, user device 102 comprises a wireless or mobile device with which a wireless telecommunication network(s) can be utilized for communication (e.g., voice and/or data communication). In this regard, the user device 102 can be any mobile computing device that communicates by way of, for example, a 3G or 4G network.

The user device 102 may utilize network 120 to communicate with other computing devices (e.g., mobile device(s), a server(s), a personal computer(s), etc.). In embodiments, network 120 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 120 may include multiple networks, as well as being a network of networks, but is shown in more simple form so as to not obscure other aspects of the present disclosure. Network 120 may be part of a telecommunications network that connects subscribers to their immediate service provider. In embodiments, network 120 is associated with a telecommunications provider that provides services to user devices, such as user device 102. For example, network 120 may provide voice services to user devices or corresponding users that are registered or subscribed to utilize the services (e.g., network 120) provided by a telecommunications provider. Network 120 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like.

The network environment 100 may include a database (not shown). The database may be similar to the memory component 512 in FIG. 5 and can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

As previously mentioned, the user device 102 may communicate with other devices by using a base station, such as base station 104. In embodiments, base station 104 is a wireless communications station that is installed at a fixed location, such at a radio tower, as illustrated in FIG. 1. The radio tower may be a tall structure designed to support one or more antennas 106 for telecommunications and/or broadcasting. In other embodiments, base station 104 is a mobile base station. The base station 104 may be an eNode B in an LTE telecommunications network and is used to communicate as part of the wireless communications network. In this way, the base station 104 can facilitate wireless communication between user device 102 and network 120.

The base station 104 may include at least one baseband unit (BBU) responsible for, among other things, digital baseband signal processing. For instance, CDMA/EVDO and LTE Internet protocol (IP) packets are received from a wireless communications network and are digitally combined by the BBU at the base station 104. The blended digital baseband signal is then transmitted to a radio at the base station 104. Digital baseband signals received from the radio are demodulated by the BBU and the resulting IP packets are then transmitted by the BBU to the network. The base station 104 may also include or be associated with an LTE System Manager (LSM) configured to manage a master list (e.g., a table) of beamforming weights. The list of beamforming weights may include a plurality of beamforming weights applicable to a plurality of antennas, antenna model numbers, down tilt angles of antennas, and the like. The listing may also including beamforming weights applicable to beamforming configurations, such as full-power broadcast beamforming and non-full power broadcast beamforming, including tapered beamforming.

As stated, the base station 104 may include a radio (not shown) or a remote radio head (RRH) that generally communicates with one or more antennas 106 associated with the base station 104. In this regard, the radio is used to transmit signals or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like.

The antenna 106 is used for telecommunications. Generally, the antenna 106 may be an electrical device that converts electric power into radio waves and converts radio waves into electric power. The antenna 106 is typically positioned at or near the top of the radio tower as illustrated in FIG. 1. Such an installation location, however, is not intended to limit the scope of embodiments of the present invention. The radio associated with the base station 104 may include at least one transceiver configured to receive and transmit signals or data. For example, the radio may transmit and receive wireless RF signals and convert the blended digital signal received from the BBU into an analog RF output via a digital-to-analog (AD) converter. The analog signal may then be amplified by an amplifier in the radio and sent out for transmission to a remote communications device, such as user device 102. The RF signals received from the remote communications device, such as user device 102, are amplified by the radio and converted to digital baseband signals for transmission to the BBU.

The antenna 106 of FIG. 1 may be configured to support multiple-input-multiple-output (MIMO) and beamforming transmission modes. In embodiments, antenna 106 may rely on a MIMO transmission mode when user device 102 is located near the radio tower and may rely on a beamforming transmission mode when the user device 102 is located on the periphery of a coverage area.

Continuing, the network environment 100 may further include a beamforming manager 110. The beamforming manager 110 may be configured to, among other things, control the weights of the beams in accordance with the present disclosure. The beamforming manager 110 may comprise a server having one or more processors. Though beamforming manager 110 is illustrated separately in FIG. 1, it may be a component of base station 104. In other embodiments, the beamforming manager 110 may be remotely located.

As mentioned, the beamforming manager 110 may control weights for the beams at one or more antennas associated with one or more base stations, such as base station 104. The beamforming manager 110 may include, among other things, a receiving component 112, a determining component 114, and weighting component 116. The receiving component 112 may receive, among other things, data from user devices, such as user device 102, within a network cell associated with a particular base station 104. The data received by the receiving component 112 may be a part of historical data received from the user device 102, the historical data indicating various information about the user device 102 and network performance. The historical data may be collected and stored over a period of time. The receiving component 112 may receive this data periodically, such as, for instance, every two to six hours, twice a day, once a day, or once a week. Longer time periods, such as two weeks to three months, and other periods of time are also contemplated in accordance with aspects disclosed herein. The data received during these periods may be used to provide information relating to a user device 102 at a specific point in time or may be used to acquire historical patterns, such as patterns of user device locations and/or densities within a network cell over time.

This data received by the receiving component 112 may include location data indicating a location of each of the user devices 102 within the cell. Location data may indicate specific coordinates of the user device 102 or may indicate a distance between the user device 102 and the base station 104 and/or a direction. The location indicated by the location data may be a single location at a point in time or may represent multiple locations of the user device 102 over a time period. In addition to location data, the receiving component 112 may receive throughput data from the user devices 102. The throughput data may indicate a throughput value. As used herein, a throughput value refers to an amount of data being transmitted or received over a communication channel in a given amount of time. This may include the rate of data being transmitted by the base station 104 or the user device 102.

Figure 2A:
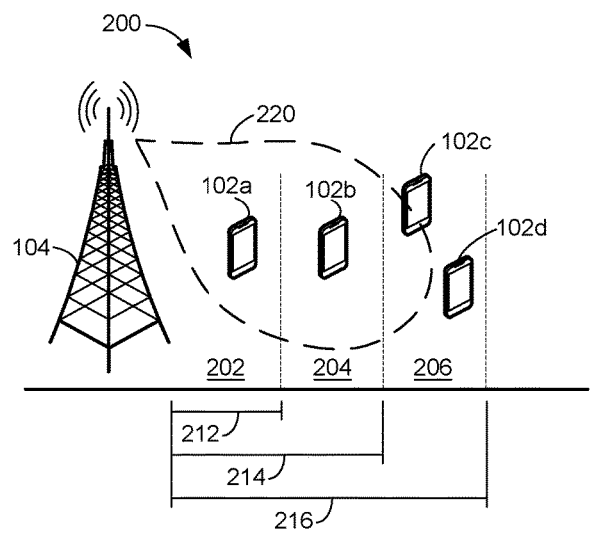
FIG. 2A depicts an operating environment in which full-power broadcast beamforming is disabled, according to an embodiment of the present invention.
Figure 2B:
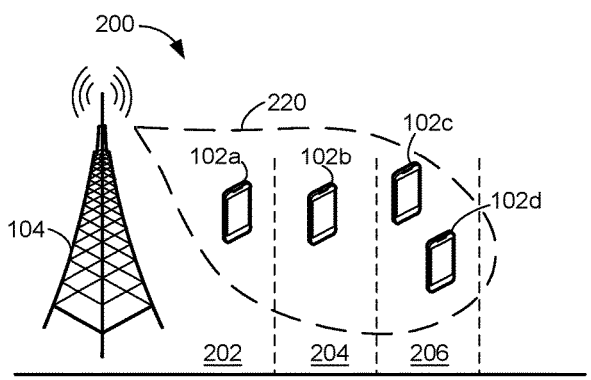
FIG. 2B depicts the operating environment of FIG. 2A in which full-power broadcast beamforming is enabled, according to an embodiment of the present invention.

Based on information received from the receiving component 112, the determining component 114 of the beamforming manager 110 may perform an analysis to ultimately determine whether to enable or to disable full-power broadcast beamforming. The analysis may comprise a number of determinations that may be performed by a single component or by separate subcomponents. One such determination may include determining the location of each of the user devices 102 within the network cell. In some embodiments, this determination is based on identifying the location of each user device 102 directly from the location data received by the receiving component 112 from the user devices 102. In other aspects, this determination involves converting the location data into a discrete region within the cell. For instance, as shown in FIGS. 2A-2B, a network cell 200 may comprise a cell center 202, cell middle 204, and a cell edge 206. The cell center 202 is the region within the network cell 200 that is adjacent and/or the closest to the base station 104. The cell middle 204 is the region adjacent the cell center 202 on a side of the cell center 202 opposite the base station 104. The cell edge 206 is the outermost region of the network cell 200, forming a periphery of the network cell 200. The cell middle 204 is positioned between the cell center 202 and the cell edge 206. Though FIGS. 2A-2B depict these regions extending from the base station 104 in only one direction, a network cell 200 typically extends 360 degrees around the base station 104 and, therefore, these regions 202, 204, and 206 also may extend from the base station 104 in 360 degrees. In other words, the cell center 202 may surround the base station 104; the cell middle 204 may surround the cell center 202; and cell edge 206 may surround the cell middle 204 to form a perimeter of the entire network cell 200.

These regions 202, 204, and 206 within the network cell 200 may be defined by a distance between the base station 104 and an outer boundary of each region. The distance 212 between the base station 104 and the outer boundary of cell center 202 is less than the distance 214 between the base station 104 and the outer boundary of the cell middle 204, which is less than the distance 216 between the base station 104 and the outer boundary of cell edge 206. Accordingly, location data indicating a distance between the base station 104 and the user device 102 (or coordinates of the user device 102 from which a distance is determined) may be used to classify the location of each user device 102 into cell center 202, cell middle 204, or cell edge 206. Alternatively, these regions 202, 204, and 206 may be defined by the geographical coordinates they cover, which may be compared to the location data indicating coordinates of user devices 102 to determine the region in which each user device 102 is located. Additionally, the location data received may not directly provide a specific location of a user device 102 but, instead, may be data indicating a signal quality for that user device 102. The signal quality may be used to determine an approximate distance from the base station 104 for classification into one of the regions 202, 204, and 206 with user devices 102 having lower signal qualities being classified as being in cell edge 206.

The distances or areas defining the regions 202, 204, and 206 within a network cell 200 may vary based on a number of factors. On such factor may be the type of geographical environment in which the network cell 200 is located. For instance, in urban environments, network cells 200 are generally closer together, thereby increasing the possibility of interference with neighboring cells. As such, a network cell 200 in an urban environment may have a narrower cell edge 206 compared to a network cell 200 within a suburban environment having a lower density of network cells. Another factor that may be considered in defining the regions 202, 204, and 206 include the radio frequency conditions within the network cell and channel quality.

Based on the locations of the user devices 102 within the network cell, the determining component 114 may determine whether to enable full-power broadcast beamforming. Determining whether to enable full-power broadcast beamforming may be done when conditions within the network cell 200 indicate that the benefits of full-power broadcast beamforming outweigh the disadvantages. As previously discussed, full-power broadcast beamforming increases the coverage area within a network cell. Accordingly, full-power broadcast beamforming may provide coverage to user devices 102 located in the cell edge 206 that would not otherwise receive consistent coverage through non-full power configurations. Accordingly, determining whether to enable full-power broadcast beamforming may include determining a number of user devices 102 within the cell edge 206 exceeds a threshold number of cell edge user devices.

In some aspects, determining whether to enable full-power broadcast beamforming is not based solely on the number of user devices 102 in the cell edge 206 but, rather, is based on a ratio of the number of user devices 102 in the cell edge 206 to the number of user devices 102 in the cell center 202 and/or cell middle 204. For example, even when the number of user devices 102 within the cell edge 206 exceeds a threshold number of devices, the number of user devices 102 in cell center 202 and/or cell middle 204 may be large enough compared to the number of user devices 102 within the cell edge 206 that the increased interference and decreased throughput associated with full-power broadcast beamforming outweighs benefits of providing coverage to a greater number of user devices 102 in the cell edge 206. Conversely, even if the number of user devices 102 within the cell edge 206 does not exceed a threshold number of cell edge user devices, full-power broadcast beamforming may still be optimal if there are not many user devices 102 in the other regions. Accordingly, using a ratio of the number of user devices 102 in cell edge 206 to the number of user devices 102 in the cell center 202 and cell middle 204 may more accurately reflect whether full-power broadcast beamforming is favored. Instead of employing a ratio, the information could be presented as a fraction or percentage of the number of user devices 102 in the cell edge 206 out of the total number of user devices 102 in the network cell 200.

To determine whether to enable full-power broadcast beamforming, a ratio of the number of user devices 102 in cell edge 206 to the number of user devices 102 in cell center 202 and cell middle 204 may be compared to a threshold ratio while a percentage of total user devices 102 that are within the cell edge 206 may be compared to a threshold percentage. The threshold ratio and threshold percentage may be determined based on the type of geographical environment in which the network cell 200 is located, radio frequency conditions within the network cell 200, and/or channel quality. For example, network cells in rural environments may have lower threshold ratios and threshold percentages than network cells in urban and suburban environment because the lower density of network cells in rural areas provides a decreased risk of interference.

In addition to considering the locations of the user devices 102, the determining component 114 may consider throughput values determined from throughput data in determining whether to enable full-power broadcast beamforming. Throughput values may include an average throughput for the user devices 102 within the network cell 200 or a throughput for a sector within the network cell 200. In some aspects, the throughput values are compared to a throughput threshold to determine whether to enable full-power broadcast beamforming. Generally, lower throughputs disfavor enablement of full-power broadcast beamforming as enabling full-power broadcast beamforming may cause a decrease in throughput. The threshold values for locations of user devices and/or throughput that are used for determining whether to enable full-power broadcast beamforming may vary from different network cells 200 depending on the type of environment in which the network cell 200 is located, the radio frequency conditions and/or channel quality within the network cell 200.

After the determining component 114 determines to enable full-power broadcast beamforming, the weighting component 116 may make adjustments to one or more beam weights to bring the plurality of beams produced at the base station 104 into full-power broadcast beamforming. Full-power broadcast beamforming occurs when each of the beams is at full power. The specific adjustments the weighting component 116 makes depends on the weighting pattern of the beams before the adjustments are made. For instance, if the base station 104 produces four beams and uses a tapered pattern in which the two middle beams are weighted at 1.0 (or 100%) and the two outside beams are weighted at 0.5 (or 50%), the weighting component 116 would adjust the weights of the two outside beams from 0.5 to 1.0 to enable full-power broadcast beamforming.

For illustrative purposes only, FIGS. 2A-2B provide an example of a network cell 200 switching from non-full-power broadcast beamforming to full-power broadcast beamforming. FIGS. 2A-2B illustrates a network cell 200 that includes four user devices 102a, 102b, 102c, and 102d (collectively referred to as 102). There is one user device 102a in cell center 202, one user device 102b in cell middle 204, and two user devices 102c and 102d in cell edge 206. In FIG. 2A, the beam 220 is not operating at full power, and, therefore, the coverage area does not fully extend to user devices 102c and 102d in cell edge 206. From this arrangement, the determining component 114 determines that there is a 1:1 ratio of cell edge user devices to non-cell edge user devices or that 50% of the total user devices 102 within the network cell 200 are cell edge user devices. The determining component 114 may determine that these values exceed a ratio or percentage threshold to trigger enablement of full-power broadcast beamforming. In response, the weighting component 116 adjusts the signal weight for beam 220 to maximum power level, as shown in FIG. 2B. Beam 220 at maximum power level now extends coverage to user devices 102c and 102d within cell edge 206.

Just as the determining component 114 may determine whether to enable full-power broadcast beamforming, the determining component 114 may also determine whether to disable full-power broadcast beamforming after it has been enabled. In determining whether to disable full-power broadcast beamforming, the same considerations for determining whether to enable full-power broadcast beamforming may be considered, but the determining component 114 is now determining to see whether conditions no longer favor full-power broadcast beamforming. For instance, the determining component 114 may use additional location data to determine the location the user devices 102 within the network cell 200 at this later time. The additional location data may indicate a different number of user devices 102 within the cell edge 206 or different number of total user devices 102 within the network cell 200 because user devices 102 may have moved within the network cell 200, new user devices 102 may have come into the network cell 200, and/or user devices 102 may have left the network cell 200. Based on the additional location data, the determining component 114 may determine to disable full-power broadcast beamforming when the number of user devices 102 within the cell edge 206 or the ratio of user devices 102 within the cell edge 206 to the number of user devices 102 within the other regions 202 and 204 does not exceed a threshold value. Additionally, in some aspects, the determining component 114 considers whether throughput has dropped below a minimum throughput threshold and whether a total number of user devices 102 within the network cell has exceeded a threshold number in determining whether to disable full-power broadcast beamforming.

A determination to disable full-power broadcast beamforming is not a determination to fully disable beamforming because service may still be provided through a non-fullpowered beamforming scheme. Accordingly, determining whether to disable full-power broadcast beamforming may also be considered as determining whether to enable non-full-power beamforming, such as tapered beamforming with a tapered weighting pattern. Because full-power broadcast beamforming occurs when each beam operates at a maximum signal strength, all beams are weighted to have the same signal strength. However, tapered beamforming occurs when one or more beams within the plurality of beams use different signal weights. In some tapered beamforming configurations, one or more beams may still be weighted to achieve a maximum signal strength but at least one beam may be weighted to a less than maximum signal strength.

Upon determining to disable full-power broadcast beamforming, the weighting component 116 may adjust the signal weight for one or more beams to less than maximum signal strength. The specific adjustments to be made depend on the non-full-power weighting pattern the base station 104 will use when not implementing full-power broadcast beamforming. This weighting pattern may be the same as the pattern used immediately before enablement of full-power broadcast beamforming or may be different.

Figure 3:
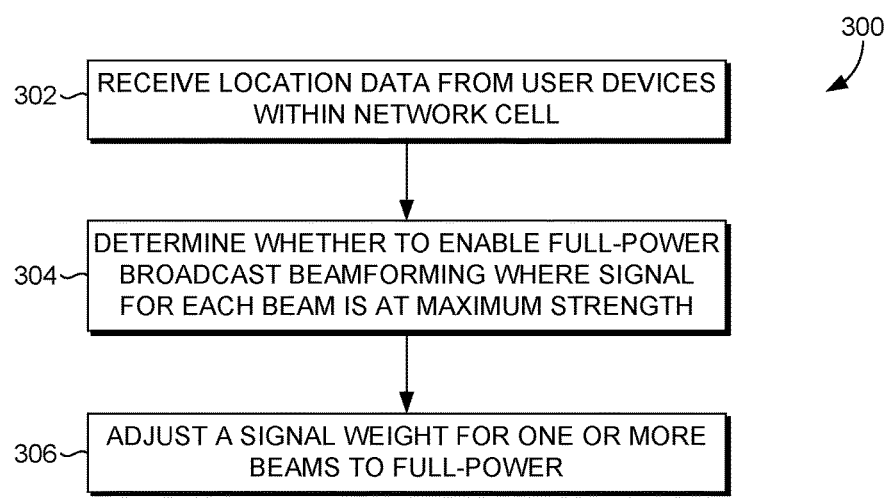
FIG. 3 depicts a flow diagram of a method for optimizing full-power broadcast beamforming within a network cell, according to embodiments of the present invention.

Turning to FIG. 3, a flow chart illustrating a method 300 for optimizing full-power broadcast beamforming within a network cell in accordance with embodiments of the present invention is provided. At step 302, location data is received from user devices within the network cell. Receiving of location data may be done by the receiving component 112 of FIG. 1 and may be performed in a similar manner as described with respect to FIG. 1. Specifically, the location data may be receive periodically and may be received with other historical data, including throughput data.

Based on the location data, a location of each of the one or more user devices within the network cell may be determined as described with respect to the determining component 114 of FIG. 1. The location of each user device may be classified as cell center, cell middle, or cell edge. Cell center may comprise a region within the network cell adjacent the base station; cell middle may comprise a region within the network cell between cell center and cell edge; and cell edge may comprise a region forming a periphery of the network cell. Based on the location of each of the user devices within the network cell, it is determined whether to enable full-power broadcast beamforming, as shown in step 304. Full-power broadcast beamforming occurs when the signal for each beam within the plurality of beams produced by the base station is at maximum strength.

Determining whether to enable full-power broadcast beamforming may be based on the number of user devices within cell edge, the total number of user devices within the network cell, and/or a throughput value based on throughput data received from the user devices. In some embodiments, full-power broadcast beamforming is enabled when the total number of user devices within the cell edge exceeds a threshold number of cell edge user devices. In other embodiments, full-power broadcast beamforming is enabled when a ratio of the number of user devices within the cell edge to the number of user devices within the cell center and/or cell middle exceeds a threshold ratio or when the percentage of the user devices in cell edge out of the total number of user devices in the network cell exceeds a threshold percentage.

At step 306, upon determining whether to enable the full-power broadcast beamforming, the signal weight for one or more beams within the plurality of the beams is adjusted to achieve full-power broadcast beamforming. In other words, the signal weight for the beams is adjusted so that each of the beams is operating at a maximum signal strength. This may be done by the weighting component 116 of FIG. 1 and in the manner discussed with respect to FIG. 1. The number of beams for which signal weights will be adjusted and the amount of each adjustment depends on the weighting pattern being utilized prior to implementation of full-power broadcast beamforming.

Figure 4:
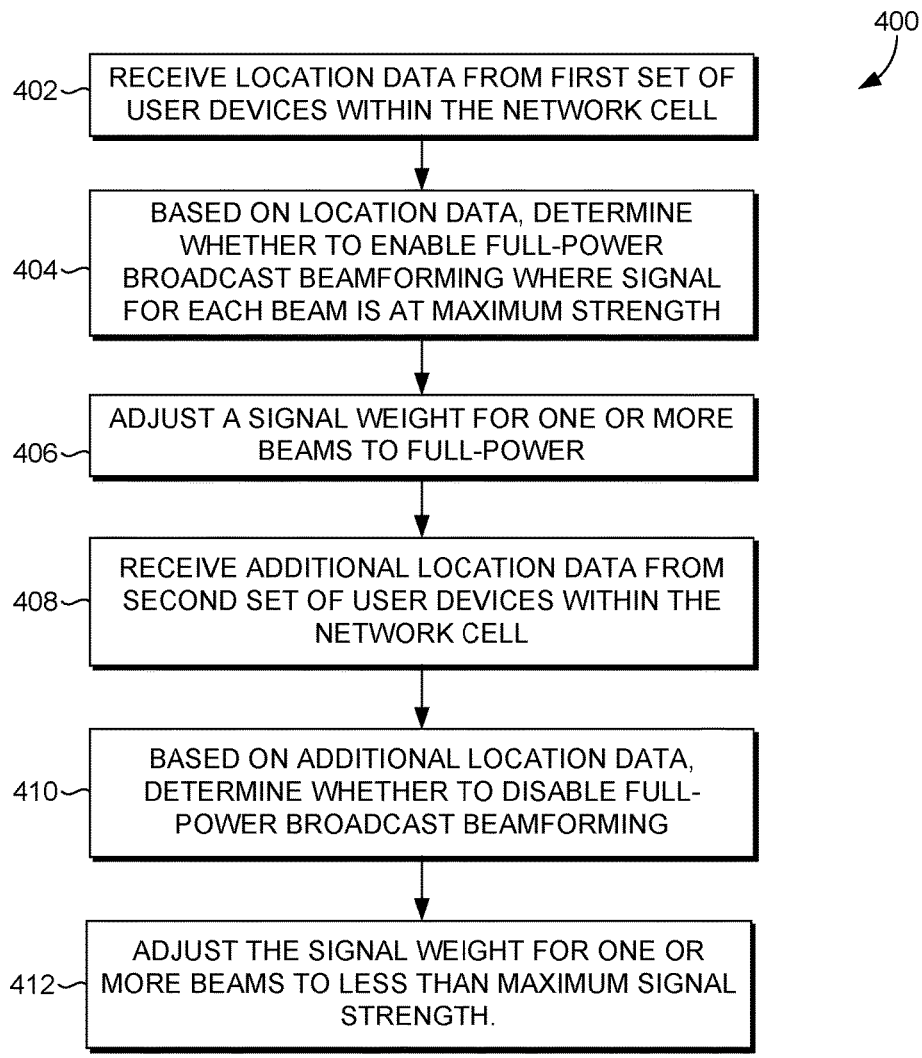
FIG. 4 depicts a flow diagram of a method for optimizing full-power broadcast beamforming within a network cell, according to embodiments of the present invention.

FIG. 4 also provides a flow chart illustrating a method 400 for optimizing full-power broadcast beamforming within a network cell in accordance with embodiments of the present invention. This method 400 is similar to the method 300 discussed with respect to FIG. 4 but includes steps for disabling full-power broadcast beamforming. Specifically, location data may be received from a first set of user devices within the network cell at step 402. The first set of user devices may comprise all of the user devices located within the network cell at the time the data is received. The location data may indicate a location, such as cell center, cell middle, or cell edge, for each of the user devices within the first set of user devices.

At step 404, it is determined whether to enable full-power broadcast beamforming in which the signal for each beam is at a maximum strength based on the location data. As discussed with respect to FIGS. 1 and 3, more user devices within cell edge favors enablement of full-power broadcast beamforming. In some aspects, however, the determination on whether to enable full-power broadcast beamforming is based on the ratio of the number of user devices in the cell edge to the number of user devices within the cell center and/or cell middle or a percentage of user devices in the cell edge out of the total number of user devices in the network cell. Upon determining to enable full-power broadcast beamforming, a signal weight for one or more beams within a plurality of beams at the base station is adjusted to a maximum power strength, which is shown at step 406.

After full-power broadcast beamforming is enabled, additional location data may be received from a second set of user devices within the network cell at step 408. The second set of user devices includes all the user devices within the network cell at the time the additional location data is received, which may be later in time than when the location data for the first set of user devices was received. The second set of user devices may include all, some, or none of the user devices within the first set of user devices as some users may move in or out of the network cell between the time the location data is first received and the time the additional location data is received. Just as with the previously-received location data, the additional location data provides an indicator of whether each user device within the second set of user devices is within cell center, cell middle, or cell edge of the network cell.

At step 410, based on the additional location data, it is determined whether to disable full-power broadcast beamforming. Determining whether to disable full-power broadcast beamforming may be done in accordance with the manner previously discussed with respect to FIG. 1. Specifically, disabling full-power broadcast beamforming may be favored when the number of cell edge user devices does not exceed a threshold number of cell edge user devices. Alternatively, disability full-power broadcast beamforming may occur when the ratio of cell edge user devices to user devices in other regions does not exceed a threshold ratio or when the percentage of the number of cell edge user devices out of the total number of user devices in the network cell does not exceed a threshold percentage. Other data, including throughput data, may also be taken into consideration. For example, a determination to disable full-power broadcast beamforming may occur when the throughput data indicates an average user throughput or a sector throughput is below a throughput threshold. As previously mentioned, determining whether to disable full-power broadcast beamforming may include determining whether to enable tapered beamforming in which at least one beam of the plurality of beams utilizes a different signal weight such that not all of the beams have the same signal weight. Upon determining to disable full-power broadcast beamforming, the method 400 further includes adjusting the signal weight for one or more beams to less than a maximum signal strength, as shown at step 412.

The method 400 may be repeated over a period of time such that the base station switches from full-power broadcast beamforming to a non-full power-broadcast beaming and back to full-power broadcast beamforming multiple times based on determinations of whether to enable or disable full-power broadcast beamforming. These steps may occur at regular intervals or may be performed on an as-needed basis.

It will be understood by those of ordinary skill in the art that the order of steps shown in the method 300 of FIG. 3 and of method 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

Figure 5:
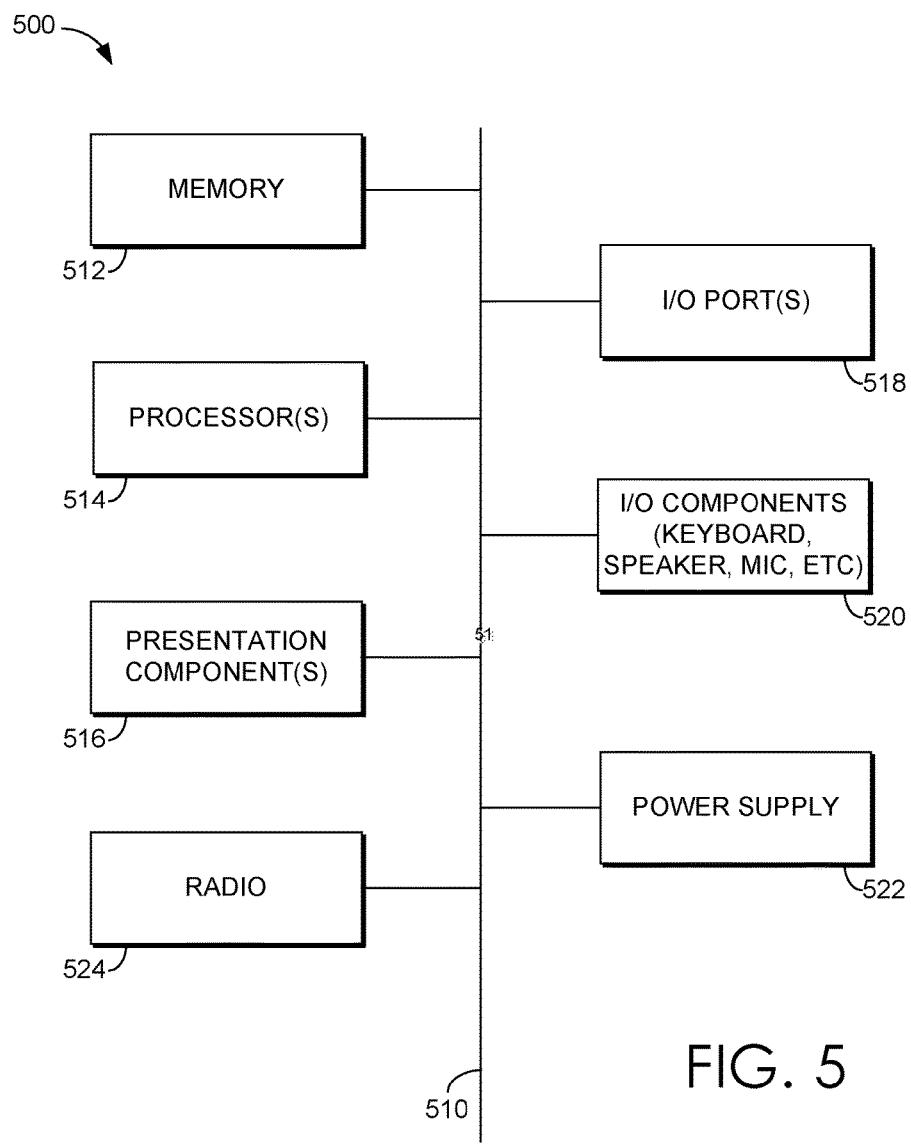
FIG. 5 depicts an exemplary computing device, according to embodiments of the present invention.

Referring to FIG. 5, an exemplary architecture for implementing aspects of the described technology as described above is shown. The exemplary architecture is designated generally as communications device 500. Communications device 500 is but one example of a suitable computing operating environment and is not intended to suggest any limitation as to the scope of use or functionality of the technology described. Neither should the computing device be interpreted as having any dependency or requirement relating to any one or a combination of components illustrated.

Although some components are shown in the singular, they may be plural. For example, communications device 500 might include multiple processors or multiple radios, etc. As illustratively shown, communications device 500 includes a bus 510 that directly or indirectly couples various components together including memory 512, a processor 514, a presentation component 516, a radio 524, input/output ports 518, input/output components 520, and a power supply 522.

Memory 512 might take the form of memory components previously described. Thus, further elaboration will not be provided here, only to say that memory component 512 can include any type of medium that is capable of storing information (e.g., a database). A database can be any collection of records. In one embodiment, memory 512 includes a set of embodied computer-executable instructions that, when executed, facilitate various aspects disclosed herein. These embodied instructions will variously be referred to as "instructions" or an "application" for short.

Processor 514 might actually be multiple processors that receive instructions and process them accordingly. Presentation component 516 includes the likes of a display, a speaker, as well as other components that can present information (such as a lamp (LED), or even lighted keyboards).

Numeral 524 represents a radio(s) that facilitates communication with a wireless-telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, or other VoIP communications. As can be appreciated, in various embodiments, radio 524 can be configured to support multiple technologies and/or multiple radios can be utilized to support multiple technologies.

Input/output port 518 might take on a variety of forms. Illustrative input/output ports include a USB jack, stereo jack, infrared port, proprietary communications ports, and the like. Input/output components 520 include items such as keyboards, microphones, speakers, touch screens, and any other item usable to directly or indirectly input data into communications device 500. Power supply 522 includes items such as batteries, fuel cells, or any other component that can act as a power source to power communications device 500.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for optimizing full-power broadcast beamforming within a network cell, the method comprising:
   at a base station having a plurality of beams, receiving location data from a first set of user devices comprising one or more user devices within the network cell, wherein the location data indicates a location of each user device within the first set of user devices;
   based on the location data, determining whether to enable full-power broadcast beamforming where a signal for each beam within the plurality of beams is at maximum signal strength; and
   upon determining to enable full-power broadcast beamforming, adjusting a signal weight for one or more beams within the plurality of beams to full power, the adjusting causes an increase in a geographic coverage area of the network cell for at least one of the first set of user devices.

2. The media of claim 1, wherein the location of each user device within the first set of user devices comprises one of cell center, cell middle, and cell edge, wherein:
   cell center comprises a region within the network cell adjacent to the base station,
   cell middle comprises a region within the network cell between cell center and cell edge, and
   cell edge comprises a region forming a periphery of the network cell.

3. The media of claim 2, wherein determining whether to enable full-power broadcast beamforming comprises determining a number of user devices within cell edge exceeds a threshold number of cell edge user devices.

4. The media of claim 2, wherein determining whether to enable full-power broadcast beamforming comprises:

determining a ratio of a number of user devices within cell edge to a number of user devices within cell center and cell middle; and determining the ratio exceeds a threshold ratio.

5. The media of claim 1, wherein the method further comprises receiving throughput data from the first set of user devices and wherein determining whether to enable full-power broadcast beamforming is further based on the throughput data.

6. The media of claim 5, wherein determining whether to enable full-power broadcast beamforming based on the throughput data comprises determining a throughput value exceeds a throughput threshold.

7. The media of claim 6, wherein the throughput value comprises one of an average throughput for the first set of user devices or a throughput for a sector within the network cell.

8. The media of claim 2, further comprising:
when full-power broadcast beamforming is enabled, receiving additional location data from a second set of user devices within the network cell, the additional data indicating a location of each user device within the second set of user devices;
determining whether to disable full-power broadcast beamforming based on the additional location data; and
upon determining whether to disable full-power broadcast beamforming, adjusting the signal weight for one or more beams within the plurality of beams to less than the maximum signal strength.

9. The media of claim 8, wherein determining whether to disable full-power broadcast beamforming comprises determining a number of user devices within cell edge does not exceed a threshold number of cell edge user devices.

10. A method for optimizing full-power broadcast beamforming at a base station within a network cell, the method comprising:
at a base station having a plurality of beams, receiving location data from a first set of user devices comprising one or more user devices within the network cell, wherein the location data indicates a location of each user device within the first set of user devices, the location for each user device being one of cell center, cell middle, and cell edge, wherein:
cell center comprises a region within the network cell adjacent to the base station,
cell middle comprises a region within the network cell between cell center and cell edge, and
cell edge comprises a region forming a periphery of the network cell;
based on the location of each user device within the first set of user devices, determining whether to enable full-power broadcast beamforming where a signal for each beam within the plurality of beams is at maximum signal strength; and
upon determining to enable full-power broadcast beamforming, adjusting a signal weight for one or more beams within the plurality of beams to full power, the adjusting causes an increase in a geographic coverage area of the network cell for at least one of the first set of user devices.

11. The method of claim 10, wherein cell center, cell middle, and cell edge are each defined by a distance from the base station and an outer boundary, wherein the distance between the base station and an outer boundary of cell center is less than the distance between the base station and an outer boundary of cell middle, which is less than the distance between the base station and an outer boundary of cell edge.

12. The method of claim 11, wherein the distance defining each of cell center, cell middle, and cell edge is based on at least one of radio frequency conditions and a type of geographical environment within the network cell.

13. The method of claim 10, wherein determining whether to enable full-power broadcast beamforming comprises:
determining a ratio of a number of user devices within cell edge to a number of user devices within cell center and cell middle; and
determining the ratio exceeds a threshold ratio.

14. The method of claim 10 further comprising:
when full-power broadcast beamforming is enabled, receiving additional location data from a second set of user devices comprising one or more user devices within the network cell, the additional location data indicating a location of each user device within the second set of user devices;
determining whether to disable full-power broadcast beamforming based on the location of each user device within the second set of user devices; and
upon determining to disable full-power broadcast beamforming, adjusting the signal weight for one or more beams within the plurality of beams to less than maximum signal strength.

15. A system for optimizing full-power broadcast beamforming at a base station within a network cell, the system comprising:
one or more processors associated with a base station having a plurality of beams; and
one or more computer storage media storing computer-executable instructions that, when executed by the one or more processors, implement a method comprising:
receiving location data from a first set of user devices comprising one or more user devices within the network cell, wherein the location data indicates a location of each user device within the first set of user devices;
based on the location of each user device, determining whether to enable full-power broadcast beamforming where a signal for each beam within the plurality of beams is at maximum signal strength; and
upon determining to enable full-power broadcast beamforming, adjusting a signal weight for one or more beams within the plurality of beams to full power, the adjusting causes an increase in a geographic coverage area of the network cell for at least one of the first set of user devices.

16. The system of claim 15, wherein the location of each user device comprises one of cell center, cell middle, and cell edge, wherein:
cell center comprises a region within the network cell adjacent to the base station,
cell middle comprises a region within the network cell between cell center and cell edge, and
cell edge comprises a region forming a periphery of the network cell.

17. The system of claim 16, wherein determining whether to enable full-power broadcast beamforming comprises:
determining a ratio of a number of user devices within cell edge to a number of user devices within cell center and cell middle; and
determining the ratio exceeds a threshold ratio.

18. The system of claim 16, wherein determining whether to enable full-power broadcast beamforming is further based on a total number of user devices within the network cell, wherein full-power broadcast beamforming is enabled when the total number of user devices does not exceed a threshold number of user devices.

19. The system of claim 15, wherein the method further comprises:
- when full-power broadcast beamforming is enabled, receiving additional location data from a second set of user devices comprising one or more user devices within the network cell, the additional data indicating a location of each user devices within the second set of user devices;
- determining whether to enable tapered beamforming based on the additional location data; and
- upon determining to enable tapered beamforming, adjusting the signal weight for one or more beams within the plurality of beams to less than the maximum signal strength.

20. The system of claim 19, wherein when tapered beamforming is enabled, one or more beams within the plurality of beams utilize different signal weights.

* * * * *